United States Patent
Prasad et al.

(10) Patent No.: US 9,785,446 B2
(45) Date of Patent: Oct. 10, 2017

(54) EFFICIENT BOOT FROM A CONNECTED DEVICE

(71) Applicant: Dell Products, L.P., Round Rock, TX (US)

(72) Inventors: Parmeshwr Prasad, Bangalore (IN); Gobind Vijayakumar, Trichy (IN); Ashish Bunkar, Indore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/565,421

(22) Filed: Dec. 10, 2014

(65) Prior Publication Data

US 2017/0068549 A1    Mar. 9, 2017

(51) Int. Cl.
*G06F 15/177* (2006.01)
*G06F 9/00* (2006.01)
*G06F 9/44* (2006.01)
*G06F 11/14* (2006.01)

(52) U.S. Cl.
CPC .......... *G06F 9/4411* (2013.01); *G06F 9/4408* (2013.01); *G06F 9/4416* (2013.01); *G06F 9/4405* (2013.01); *G06F 11/1417* (2013.01)

(58) Field of Classification Search
CPC .... G06F 9/4405; G06F 9/4403; G06F 9/4411; G06F 11/1417
See application file for complete search history.

(56) References Cited

U.S. PATENT DOCUMENTS

| | | | | |
|---|---|---|---|---|
| 7,134,007 B2* | 11/2006 | Zimmer | ................ | G06F 9/4411 713/1 |
| 7,873,822 B2* | 1/2011 | Kim | ...................... | G06F 9/4401 710/10 |
| 2004/0123201 A1* | 6/2004 | Nguyen | .............. | G06F 11/1641 714/736 |
| 2006/0149959 A1* | 7/2006 | Rothman | .............. | G06F 9/4406 713/2 |
| 2011/0231640 A1* | 9/2011 | Avadhanam | .......... | G06F 9/4403 713/2 |

* cited by examiner

*Primary Examiner* — Xuxing Chen
(74) *Attorney, Agent, or Firm* — Norton Rose Fulbright US LLP (57) ABSTRACT

Methods and systems for efficient boot from a connected device are described. In an embodiment, a method for efficient boot from a connected device may include initializing a base processor device for boot and configuration of an information handling system from a connected device. The method may also include initializing at least one secondary processor for parallel processing of one or more initialization functions. Additionally, the method may include offloading one or more initialization functions to the one or more secondary processors in response to a predetermined trigger event.

17 Claims, 7 Drawing Sheets

EFFICIENT BOOT FROM A CONNECTED DEVICE

FIELD

This disclosure relates generally to information handling systems, and more specifically, to efficient boot from a connected device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems may boot from a connected device, such as an external data storage device, optical reader, network server, or the like. For example, servers are often connected to one or more external data storage devices via a Small Computer System Interface (SCSI) or Internet Small Computer System Interface (iSCSI) data connection. In particular, some information handling systems are configured for boot from iSCSI offload using a Host Bus Adapter (HBA). Typically, systems have to go through a process of booting through the HBA interface before booting the installation media in the Basic Input Outpus System (BIOS) post. The BIOS is commonly initial code which gives environment to boot the Operating System (OS). Systems often boot from an iSCSI device in Unified Extensible Firmware Interface (UEFI) mode.

In an ordinary system, the boot from external media process includes the system receiving power and initializing the BIOS. Next, the HBA is configured in the system BIOS. After the system BIOS is initialized, the external device may be initialized in the system BIOS. The system may then boot in the BIOS post through the HBA interface to update iSCSI Boot Firmware Table (IBFT). Finally, the system may boot through media or through the Logic Unit Number (LUN), which is a logical number to identify the iSCSI disk. Typically, the data required to access the iSCSI LUN is available early in the process, but does not get processed until the boot at the BIOS post. Unfortunately, the step of device initialization can take a substantial amount of time, for example up to a few minutes. Waiting to boot until the device initialization is completed can take more time than necessary, and presents unacceptable delays to the user.

SUMMARY

Methods and systems for efficient boot from a connected device are described. In an embodiment, a method for efficient boot from a connected device may include initializing a base processor device for boot and configuration of an information handling system from a connected device. The method may also include initializing at least one secondary processor for parallel processing of one or more initialization functions. Additionally, the method may include offloading one or more initialization functions to the one or more secondary processors in response to a predetermined trigger event.

In an embodiment, the method may include initializing the at least one secondary processors further comprises initializing a PA manager. The method may further include initializing the PA manager in a UEFI core code. Additionally, the method may include initializing MP services of the UEFI core code with the PA manager. The method may also include initializing a first AP and a second AP as secondary processors for parallel processing with the MP services.

In one embodiment, device option Read Only Memory (ROM) processing is offloaded to the at least one parallel processors for parallel processing. In an embodiment, the trigger event is a call from system BIOS for processing of the device option ROM.

An embodiment of an apparatus may include a base processor device configured to boot an information handling system from a connected device. The apparatus may also include at least one secondary processor coupled to the base processor for parallel processing of one or more initialization functions. Additionally, the apparatus may include a processing manager configured to offload one or more initialization functions to the one or more secondary processors in response to a predetermined trigger event.

A tangible non-transitory machine-readable medium is also described. In an embodiment, the machine-readable medium includes executable instructions that, when executed by a machine, cause the machine to perform certain operations. In an embodiment, the operations may include initializing a base processor device for boot and configuration of an information handling system from a connected device. Additionally, the operations may include initializing at least one secondary processor for parallel processing of one or more initialization functions. The operations may also include offloading one or more initialization functions to the one or more secondary processors in response to a predetermined trigger event.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of methods and systems for efficient boot from a connected device are described. The described embodiments may reduce boot time when the host is booting from iSCSI in UEFI mode. Additionally, the described embodiments may provide options for early failure prediction before the UEFI code is completely booted. The described embodiments may include a secondary Application Processor (AP) may be initialized and portions of the boot process may be handed off to the AP for parallel processing, thus significantly reducing the overall boot time, and providing early warnings of boot failures.

Figure 1:
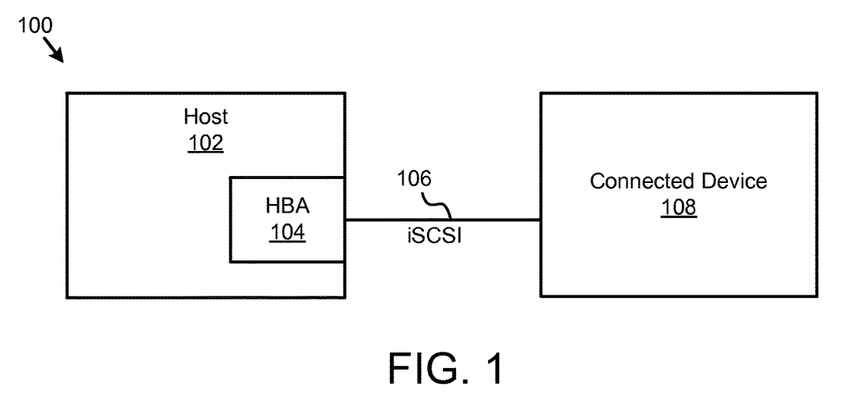
FIG. 1 is a schematic block diagram illustrating one embodiment of a system for efficient boot from a connected device.

FIG. 1 is a schematic block diagram illustrating one embodiment of a 100 for efficient boot from a connected device 108. In an embodiment, the system 100 includes a host 102. The host 102 may be a server, a storage controller, or other similar information handling system that connects to one or more connected devices 108. In an embodiment, the host 102 may connect to the connected device 108 through the HBA 104 to establish an iSCSI connection 106.

In an embodiment, the Multi-Processor (MP) services feature of UEFI may be used to offload processing of option ROM data to a pre-initialized co-processor, such as an AP. Such embodiments are described in greater detail below with reference to FIG. 3.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 2:
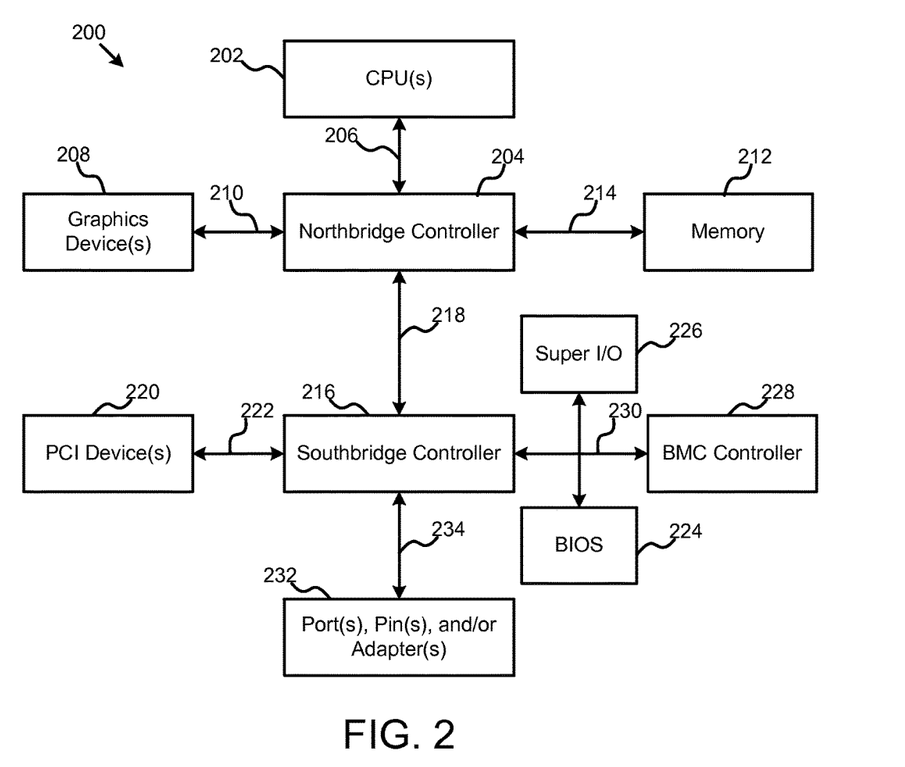
FIG. 2 is a schematic block diagram illustrating one embodiment of an Information Handling System (IHS) configured for efficient boot from a connected device.

FIG. 2 is a schematic block diagram illustrating one embodiment of an IHS 200 which may be programmed according to embodiments of the host 102 and/or the connected device 108 of FIG. 1. As shown, IHS 200 includes one or more CPUs 202. In various embodiments, IHS 200 may be a single-processor system including one CPU 202, or a multi-processor system including two or more CPUs 202 (e.g., two, four, eight, or any other suitable number). CPU(s) 202 may include any processor capable of executing program instructions. For example, in various embodiments, CPU(s) 202 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 202 may commonly, but not necessarily, be implement the same ISA.

CPU(s) 202 are coupled to northbridge controller or chipset 204 via front-side bus 206. In most embodiments, the front-side bus 206 will include multiple data links arranged in a set or bus configuration. Northbridge controller 204 may be configured to coordinate I/O traffic between CPU(s) 202 and other components. For example, in this particular implementation, northbridge controller 204 is coupled to graphics device(s) 208 (e.g., one or more video cards or adaptors, etc.) via graphics bus 210 (e.g., an Accelerated Graphics Port or AGP bus, a Peripheral Component Interconnect or PCI bus, etc.). Northbridge controller 204 is also coupled to system memory 212 via memory bus 214. Memory 212 may be configured to store program instructions and/or data accessible by CPU(s) 202. In various embodiments, memory 212 may be implemented using any suitable memory technology, such as static RAM (SRAM), synchronous dynamic RAM (SDRAM), nonvolatile/Flash-type memory, or any other type of memory.

Northbridge controller 204 is coupled to southbridge controller or chipset 216 via internal bus 218. Generally, southbridge controller 216 may be configured to handle various of IHS 200's I/O operations, and it may provide interfaces such as, for instance, Universal Serial Bus (USB), audio, serial, parallel, Ethernet, etc., via port(s), pin(s), and/or adapter(s) 232 over bus 234. For example, southbridge controller 216 may be configured to allow data to be exchanged between IHS 200 and other devices, such as other IHSs attached to a network. In various embodiments, southbridge controller 216 may support communication via wired or wireless general data networks, such as any suitable type of Ethernet network, for example; via telecommunications/ telephony networks such as analog voice networks or digital fiber communications networks; via storage area networks such as Fiber Channel SANs; or via any other suitable type of network and/or protocol.

Southbridge controller 216 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 200 through a wired or wireless connection. As shown, southbridge controller 216 is further coupled to one or more PCI devices 220 (e.g., modems, network cards, sound cards, video cards, etc.) via PCI bus 222. Southbridge controller 216 is also coupled to Basic I/O System (BIOS) 224, Super I/O Controller 226, and Baseboard Management Controller (BMC) 228 via Low Pin Count (LPC) bus 230.

BIOS 224 includes non-volatile memory having program instructions stored thereon. Those instructions may be usable CPU(s) 202 to initialize and test other hardware components and/or to load an Operating System (OS) onto IHS 200. As such, BIOS 224 may include a firmware interface that allows CPU(s) 202 to load and execute certain firmware, as described in more detail below. In some cases, such firmware may include program code that is compatible with the Unified Extensible Firmware Interface (UEFI) specification, although other types of firmware may be used.

BMC controller 228 may include non-volatile memory having program instructions stored thereon that are usable by CPU(s) 202 to enable remote management of IHS 200. For example, BMC controller 228 may enable a user to discover, configure, and manage BMC controller 228, setup configuration options, resolve and administer hardware or software problems, etc. Additionally or alternatively, BMC controller 228 may include one or more firmware volumes, each volume having one or more firmware files used by the BIOS' firmware interface to initialize and test components of IHS 200.

Super I/O Controller 226 combines interfaces for a variety of lower bandwidth or low data rate devices. Those devices may include, for example, floppy disks, parallel ports, keyboard and mouse, temperature sensor and fan speed monitoring, etc. For example, the super I/O controller 226 may be coupled to the one or more upstream sensors 206 and to the one or more downstream sensors 208.

In some cases, IHS 200 may be configured to access different types of computer-accessible media separate from memory 212. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 204 and/or southbridge controller 216.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 204 may be combined with southbridge controller 216, and/or be at least partially incorporated into CPU(s) 202. In other implementations, one or more of the devices or components shown in FIG. 2 may be absent, or one or more other components may be added. Accordingly, systems and methods described herein may be implemented or executed with other computer system configurations. In some cases, various elements shown in FIG. 2 may be mounted on a motherboard and protected by a chassis or the like.

Figure 3:
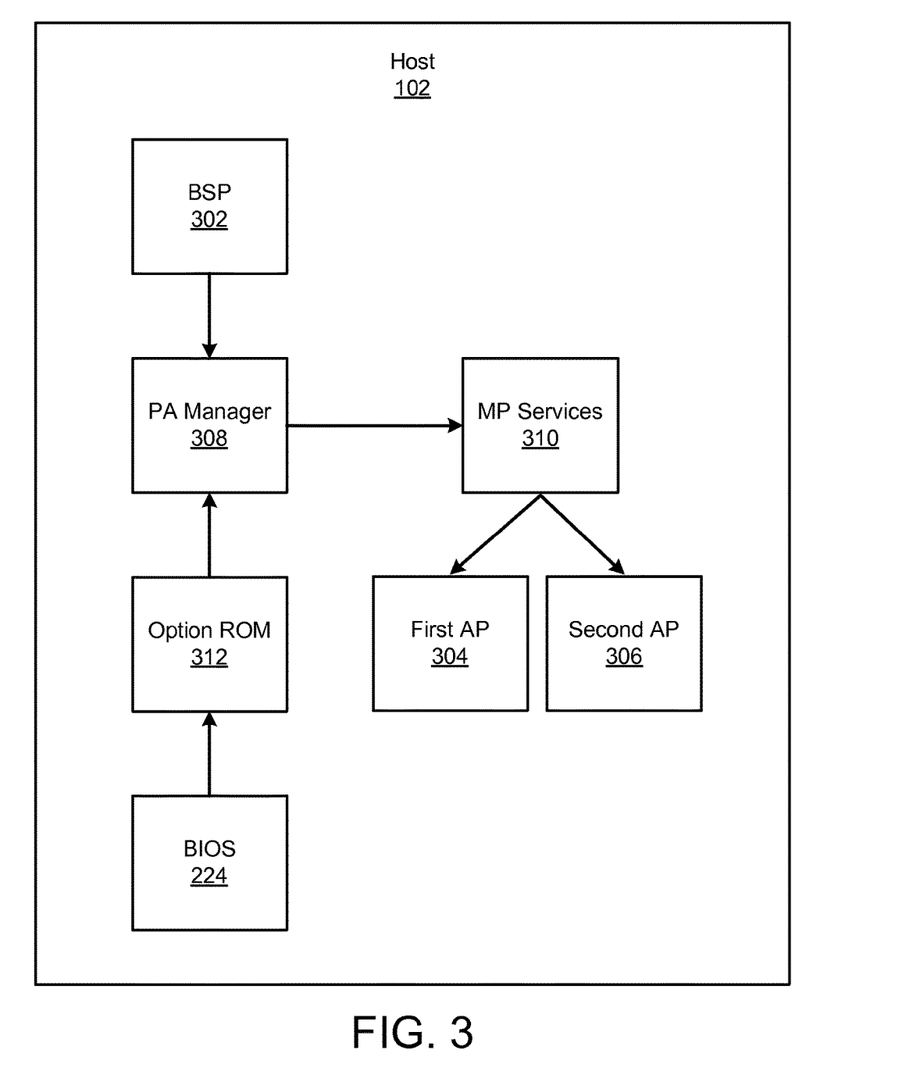
FIG. 3 is a schematic block diagram illustrating one embodiment of an apparatus for efficient boot from a connected device.

FIG. 3 is a schematic block diagram illustrating one embodiment of an apparatus for efficient boot from a connected device. In an embodiment, the apparatus may be the host 102. In some embodiments, the host 102 may include a Bootstrap Processor (BSP) 302, a first AP 304, a second AP 306, an PA manager 308, an option ROM 312 and a BIOS 224. In some embodiments, the BSP 302, the first AP 304, and the second AP 306 may each be separate and distinct processing devices. In other embodiments, the first AP 304 and the second AP 306 may be logically defined processing units of common CPU(s) 202. Similarly, the PA manager 308, and BIOS 224 may be distinct physical components of the information handling system 200, or may be logical units defined by firmware or software. One of ordinary skill will recognize a variety of different configuration possibilities, depending upon the resources available in a given platform.

In an embodiment, upon powering on the host 102, the BSP 302 and the system memory may undergo an initialization process. Next, the BSP 302 may initialize the PA manager 308. The PA manager 308 may initialize the MP services 310, which may then initialize the first AP 304 and the second AP 306. If the BIOS 224 triggers configuration of the device option ROM 312, the PA Manager 308 may be triggered, and cause data from the device option ROM 312 to be loaded into one or both of the pre-initialized Aps 304-306 for processing.

Specifically, the PA Manager 308 may be configured to initialize MP Services and the Aps 304-306 and keep them ready to handle offloaded processing from the BSP 302. An example of this process is described below with reference to FIG. 5. Additionally, the BIOS 224 may make a call to the PA manager 308 when it the device option ROM 312 has been designated for data processing. In such an embodiment, the PA manager 308 may receive an option ROM data structure as input, offload or start data processing in one or both of the initialized Aps 304-306, monitor the completion of the task for errors, pass the return BDS and log events. Further embodiments of such processes are described below with reference to FIGS. 6-7.

Figure 4:
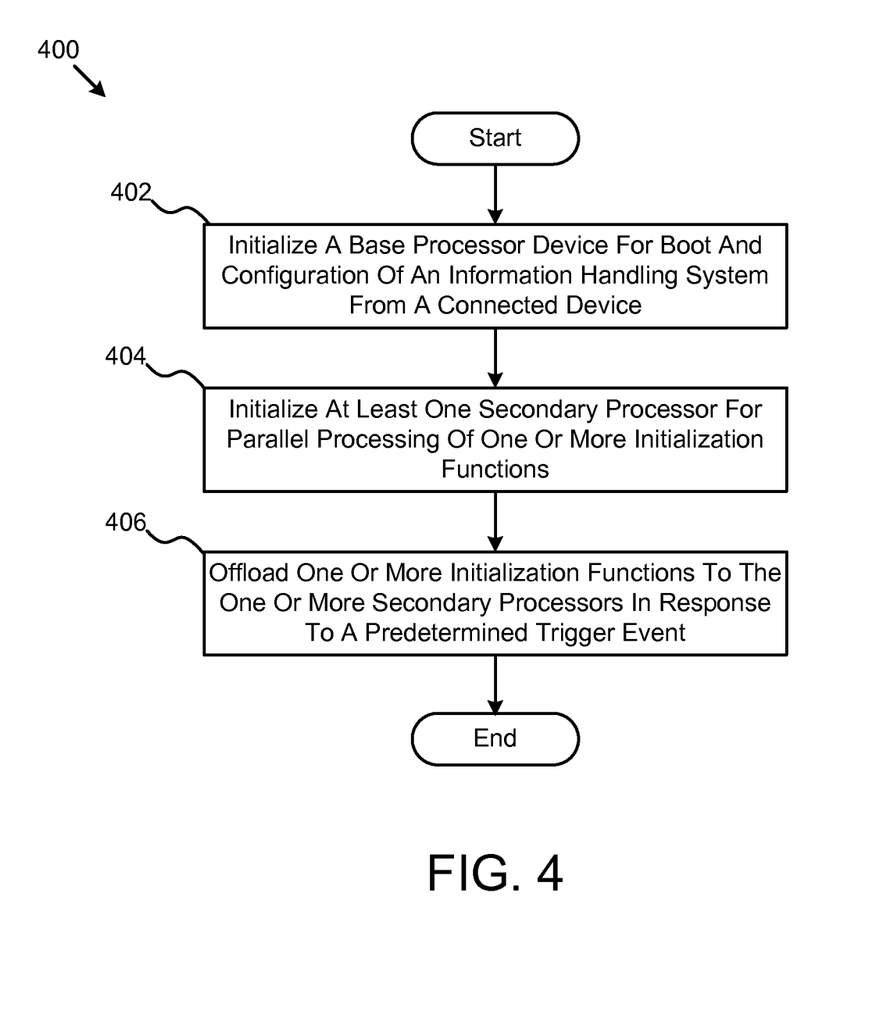
FIG. 4 is a schematic flowchart diagram illustrating one embodiment of a method for efficient boot from a connected device.

FIG. 4 is a schematic flowchart diagram illustrating one embodiment of a method 400 for efficient boot from a connected device 108. In an embodiment, the method 400 includes initializing a base processor device for boot and configuration of an information handling system from a connected device, as shown at block 402. The method 400 may also include initializing at least one secondary processor for parallel processing of one or more initialization functions, as shown at block 404. At block 406, the method 400 includes offloading one or more initialization functions to the one or more secondary processors in response to a predetermined trigger event. Further embodiments of the method 400 of FIG. 4 are described below with reference to FIGS. 5-7.

Figure 5:
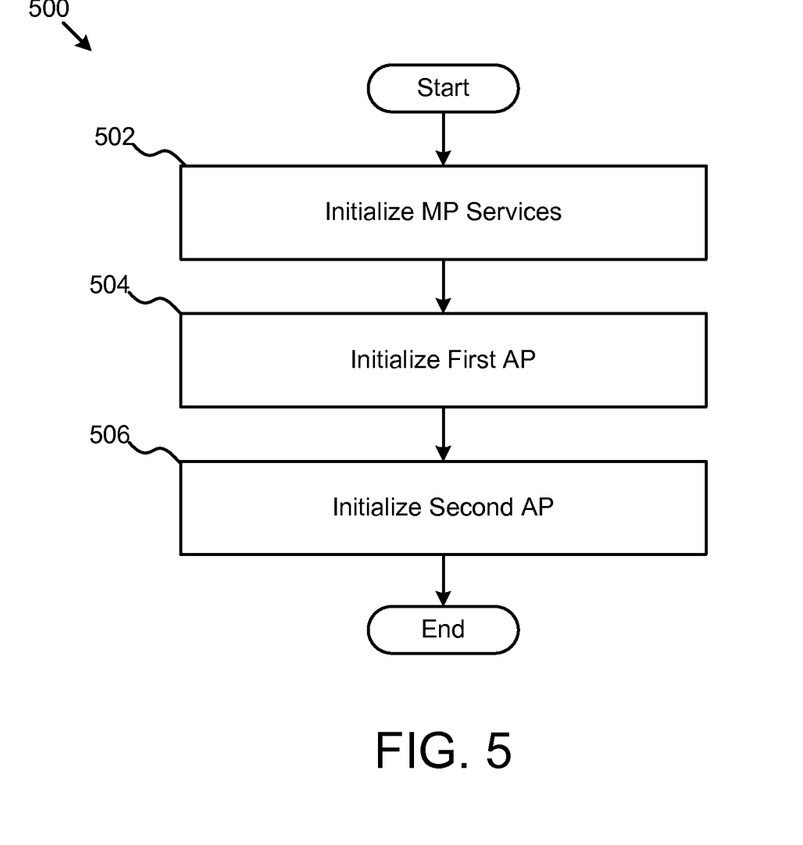
FIG. 5 is a schematic flowchart diagram illustrating one embodiment of a method for initializing components of a system for efficient boot from a connected device.

FIG. 5 is a schematic flowchart diagram illustrating one embodiment of a method 500 for initializing components of a system 100 for efficient boot from a connected device 108. In an embodiment, the method 500 includes initializing MP services 310, as shown at block 502. At block 504, the method 500 may include initializing a first AP 304, and at block 506 the method may include initializing the second AP 306. In a further embodiment, the method 500 may include keeping the first AP and the second AP available and ready for parallel processing of one or more functions offloaded from the BSP 302.

Figure 6:
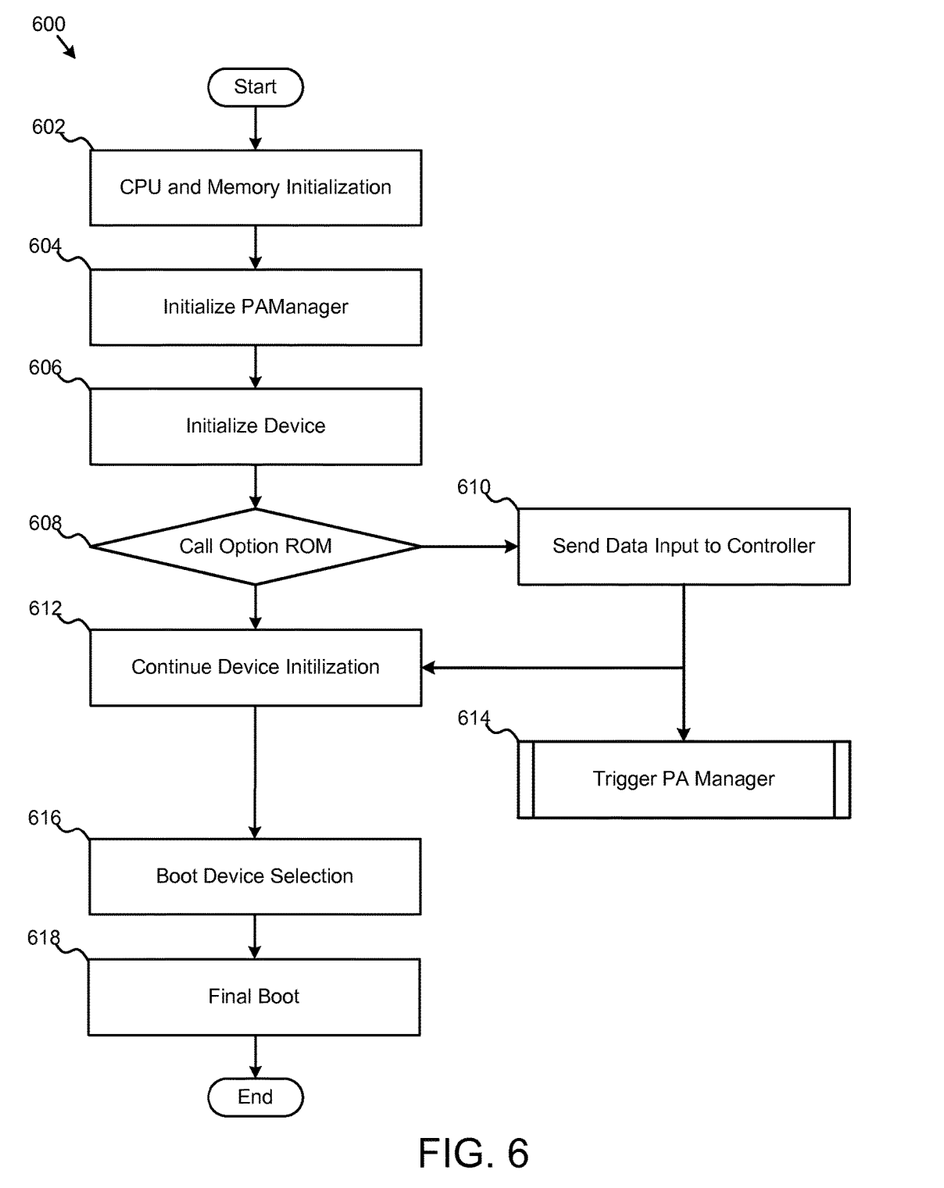
FIG. 6 is a schematic flowchart diagram illustrating one embodiment of a process for optimization of a system boot process for efficient boot from a connected device.

FIG. 6 is a schematic flowchart diagram illustrating one embodiment of a process 600 for optimization of a system boot process for efficient boot from a connected device 108. At block 602, the method 600 includes initializing system memory 212 and CPU(s) 202. In a particular embodiment, the CPU(s) 202 may be the BSP 302. The BSP 302 may initialize the PA manager 308 as shown at block 604. In some embodiments, the PA manager may initialize the MP services 310 and the Aps 304-306 as described above with reference to FIG. 5. The BIOS 224 may then begin device initialization, as shown at block 606.

If the BIOS 224 makes a call to the device option ROM 312, then the option ROM data structure may be sent as input to the PA manager 308, as shown at block 610. In response the device initialization may continue as shown at block 612, and the PA manager may be triggered as, shown at block 614, to conduct parallel processing of the option ROM data. The device selections may be booted at block 616, and finally, the final system boot may be performed at block 618. Further embodiments of the process performed by the PA manager 308 after being triggered at block 614 are described below with reference to FIG. 7.

Figure 7:
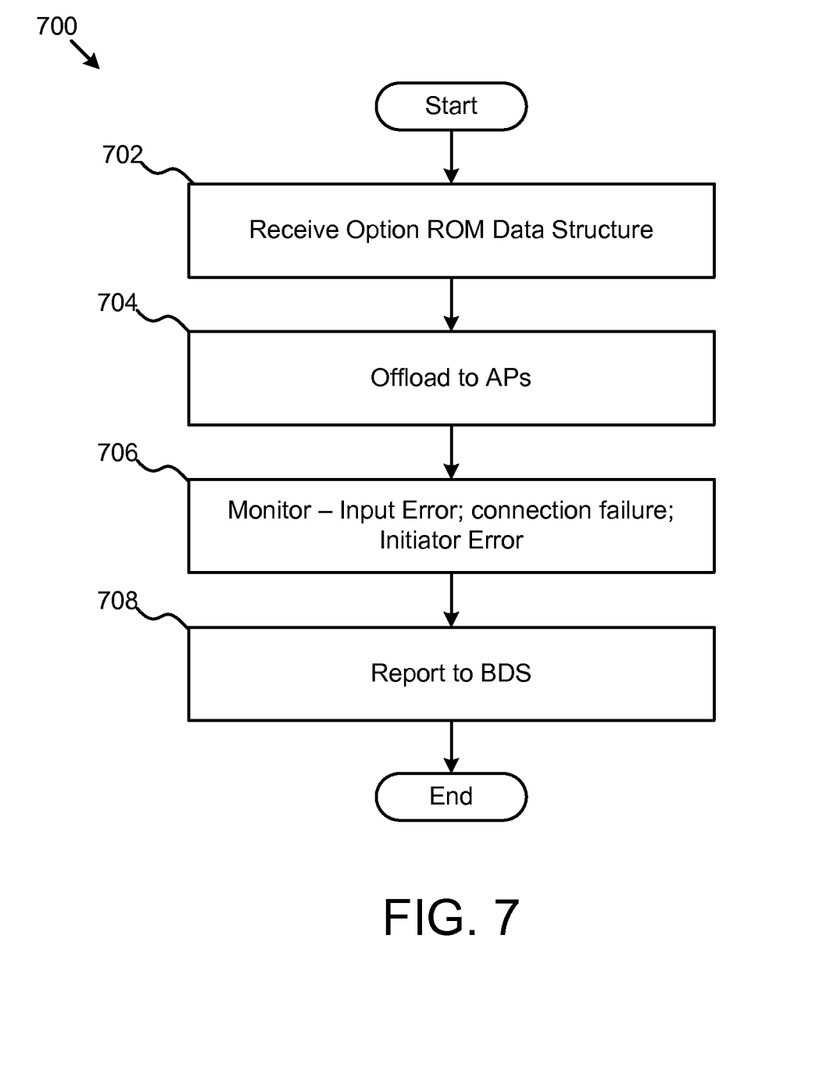
FIG. 7 is a schematic flowchart diagram illustrating a further embodiment of a process for efficient boot from a connected device.

FIG. 7 is a schematic flowchart diagram illustrating a further embodiment of a process 614 for efficient boot from a connected device. In an embodiment, the process 614 is performed as a result of the BIOS 224 calling the device option ROM 312, as described above with relation to FIG. 6. In an embodiment, the PA manager 308 may receive the option ROM data structure from the option ROM 312 as shown at block 702. The PA manager 308 may then offload processing of the option ROM data structure to at least one of the first AP 304 and the second AP 306 for parallel processing, as shown at block 704. The processing of the option ROM data may be monitored for input errors, connection failures, and/or initiator errors as shown at block 706. The result of the processing and monitoring steps may be reported back to the Boot Device Selection (BDS), as shown at block 708.

Upon successful completion of the steps described in FIGS. 4-7, the host 102 may boot from data stored on the connected device 108 via the HBA 104 and iSCSI connection 106. If the steps described above are followed, more quicker, more efficient boot process may occur, as compared with prior systems and methods. Additionally, the boot process may be more closely monitored, as described in FIG. 7.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
   initializing a base processor device for boot and configuration of an information handling system from a connected device;
   initializing at least one secondary processor for parallel processing of one or more initialization functions; and
   offloading one or more initialization functions to the at least one secondary processor in response to a predetermined trigger event after initialization of the at least one secondary processor, wherein the one or more initialization functions comprise processing a device option Read Only Memory (ROM) for the connected device to initialize the connected device; and
   booting and configuring the information handling system from the connected device,
   wherein the offloading of one or more initialization functions comprises offloading processing of the device option ROM for the connected device to the at least one secondary processor in response to the predetermined trigger event to perform parallel processing of the one or more initialization functions.

2. The method of claim 1, wherein initializing the at least one secondary processors further comprises initializing a manager.

3. The method of claim 2, further comprising initializing the manager in a Unified Extensible Firmware Interface (UEFI) core code.

4. The method of claim 3, further comprising initializing Multi-Processor (MP) services of the UEFI core code with the manager.

5. The method of claim 4, further comprising initializing a first Application Processor (AP) and a second AP as secondary processors for parallel processing of the device option ROM with the MP services, and
   wherein the manager is configured to detect errors in the processing of the device option ROM by the first AP and the second AP and report the errors to a Boot Device Selection.

6. The method of claim 1, wherein the predetermined trigger event is a call from system Basic I/O System (BIOS) for processing of the device option ROM.

7. An apparatus, comprising:
a base processor device, configured to boot an information handling system from a connected device;
at least one secondary processor coupled to the base processor for parallel processing of one or more initialization functions; and
a processing manager configured to offload one or more initialization functions to the at least one secondary processor in response to a predetermined trigger event after initialization of the at least one secondary processor, wherein the one or more initialization functions comprise processing a device option Read Only Memory (ROM) for the connected device to initialize the connected device,
wherein the offloading of the one or more initialization functions comprises offloading processing of the device option ROM for the connected device to the at least one secondary processor, in response to the predetermined trigger event to perform parallel processing of the one or more initialization functions.

8. The apparatus of claim 7, wherein the processing manager is initialized in a Unified Extensible Firmware Interface (UEFI) core code.

9. The apparatus of claim 8, further comprising initializing Multi-Processor (MP) services of the UEFI core code with the manager.

10. The apparatus of claim 9, wherein the at least one secondary processors comprise a first Application Processor (AP) and a second AP that are configured for parallel processing of the device option ROM by the MP services, and
wherein the manager is configured to detect errors in the processing of the device option ROM by the first AP and the second AP and report the errors to a Boot Device Selection.

11. The apparatus of claim 7, wherein the predetermined trigger event is a call from system Basic I/O System (BIOS) for processing of the device option ROM.

12. A tangible non-transitory machine-readable medium comprising executable instructions that, when executed by a machine, cause the machine to perform operations comprising:
initializing a base processor device for boot and configuration of an information handling system from a connected device;
initializing at least one secondary processor for parallel processing of one or more initialization functions;
offloading one or more initialization functions to the at least one secondary processor in response to a predetermined trigger event after initialization of the at least one secondary processor, wherein the one or more initialization functions comprise processing a device option Read Only Memory (ROM) for the connected device to initialize the connected device; and
booting and configuring the information handling system from the connected device,
wherein the offloading of one or more initialization functions comprises offloading processing of the device option ROM for the connected device to the at least one secondary processor in response to the predetermined trigger event to perform parallel processing of the one or more initialization functions.

13. The tangible medium of claim 12, wherein initializing the at least one secondary processors further comprises initializing a manager.

14. The tangible medium of claim 13, further comprising initializing the manager in a Unified Extensible Firmware Interface (UEFI) core code.

15. The tangible medium of claim 14, further comprising initializing Multi-Processor (MP) services of the UEFI core code with the manager.

16. The tangible medium of claim 15, further comprising initializing a first Application Processor (AP) and a second AP as secondary processors for parallel processing of the device option ROM with the MP services, and
wherein the manager is configured to detect errors in the processing of the device option ROM by the first AP and the second AP and report the errors to a Boot Device Selection.

17. The tangible medium of claim 12, wherein the predetermined trigger event is a call from system Basic I/O System (BIOS) for processing of the device option ROM.

* * * * *